United States Patent
Hegde et al.

(10) Patent No.: US 11,019,023 B1
(45) Date of Patent: May 25, 2021

(54) CONTAINER ORCHESTRATION SYSTEM (COS) SERVICES DISCOVERY ACROSS MULTIPLE COS CLUSTERS BASED ON COS CLUSTER DOMAIN NAME SYSTEM

(71) Applicant: salesforce.com, inc., San Francisco, CA (US)

(72) Inventors: Dhiraj Hegde, San Jose, CA (US); Ashutosh Parekh, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/993,118

(22) Filed: Aug. 13, 2020

(51) Int. Cl.
*G06F 15/16* (2006.01)
*G06F 9/54* (2006.01)
*H04L 29/06* (2006.01)
*H04L 29/12* (2006.01)
*H04L 29/08* (2006.01)

(52) U.S. Cl.
CPC ...... *H04L 61/1541* (2013.01); *H04L 61/1511* (2013.01); *H04L 61/2076* (2013.01); *H04L 67/1053* (2013.01); *H04L 67/1091* (2013.01)

(58) Field of Classification Search
CPC .............. H04L 61/1541; H04L 61/1511; H04L 61/2076; H04L 67/1053
USPC ........................................................ 709/223
See application file for complete search history.

(56) References Cited

U.S. PATENT DOCUMENTS

| | | | |
|---|---|---|---|
| 7,730,478 B2 | 6/2010 | Weissman | |
| 10,572,506 B2 | 2/2020 | Hegde et al. | |
| 2018/0260125 A1* | 9/2018 | Botes | G06F 3/067 |
| 2019/0222988 A1* | 7/2019 | Maes | H04L 41/5035 |
| 2019/0235775 A1 | 8/2019 | Zwiegincew et al. | |
| 2019/0342266 A1* | 11/2019 | Ramachandran | H04L 63/029 |
| 2020/0401452 A1* | 12/2020 | Piercey | G06F 9/5027 |
| 2020/0412688 A1* | 12/2020 | Cochran | H04L 61/1511 |
| 2021/0004270 A1* | 1/2021 | Singh | H04L 67/125 |
| 2021/0019194 A1* | 1/2021 | Bahl | G06F 9/5072 |

OTHER PUBLICATIONS

D. Bernstein, "Containers and Cloud: From LXC to Docker to Kubernetes," in IEEE Cloud Computing, vol. 1, No. 3, pp. 81-84, Sep. 2014, doi: 10.1109/MCC.2014.51. (Year: 2014).*
(Continued)

*Primary Examiner* — Hamza N Algibhah
(74) *Attorney, Agent, or Firm* — Nicholson De Vos Webster & Elliott LLP

(57) ABSTRACT

Container orchestration system (COS) service discovery across multiple COS clusters based on COS cluster domain name system (DNS) is described. An indication that a first COS service and first COS endpoints are created in a first COS cluster is received. In response to the receipt of the indication, a request to create, in a second COS cluster, a second COS service and second COS endpoints is transmitted. The second COS service and the second COS endpoints correspond to the first COS service and the first COS endpoints. The creation of the second COS service and the second COS endpoints causes insertion of first DNS records in a first DNS server that is local to the second COS cluster enabling COS pods of the second COS cluster to communicate with the COS pods of the first COS cluster through a network.

22 Claims, 9 Drawing Sheets

(56) References Cited

OTHER PUBLICATIONS

Truyen, Eddy; Van Landuyt, Dimitri; Preuveneers, Davy; Lagaisse, Bert; Joosen, Wouter. 2019. "A Comprehensive Feature Comparison Study of Open-Source Container Orchestration Frameworks" Appl. Sci. 9, No. 5: 931. https://doi.org/10.3390/app9050931 (Year: 2019).*
Github, "Kubernetes-Sigs/External-DNS", Available Online at <https://github.com/kubernetes-sigs/external-dns>, Aug. 5, 2020, 13 pages.
Kubernetes, "Kubernetes Components", Available Online at <https://kubernetes.io/docs/concepts/overview/components/>, Jul. 22, 2020, 8 pages.
Kubernetes, "Kubernetes Service", Available Online at <https://kubernetes.io/docs/concepts/services-networking/service/>, Jul. 17, 2020, 27 pages.
PLATFORM9, "Kubernetes Service Discovery: A Practical Guide", Available Online at <https://platform9.com/blog/kubernetes-service-discovery-principles-in-practice/>, Oct. 7, 2019, 8 pages.

* cited by examiner

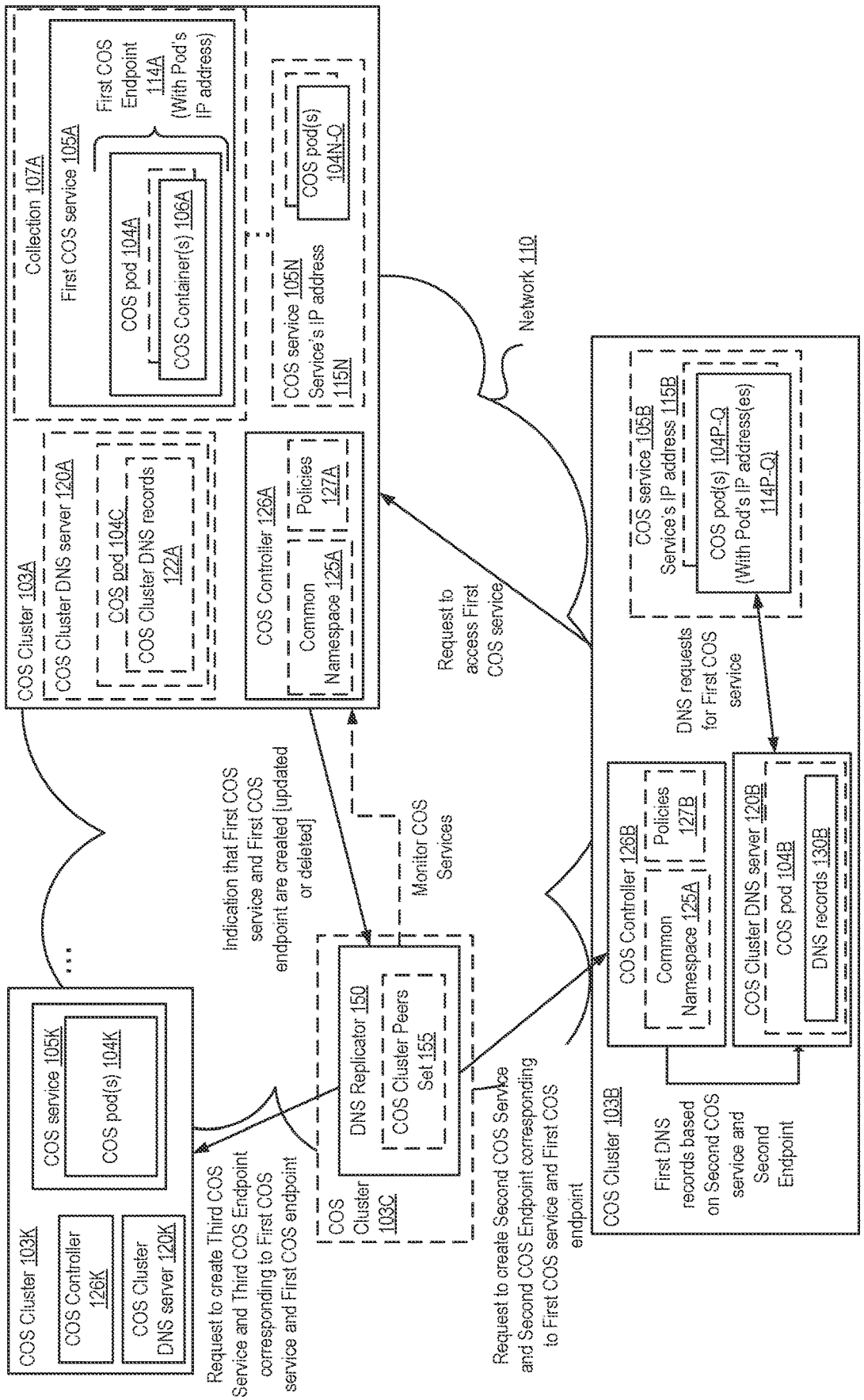

Fig. 1C

| COS Cluster Peers Set 155 ||  |
|---|---|---|
| COS Cluster | COS Cluster Peer(s) ||
| ID of First COS Cluster 103A | ID of Second COS Cluster 103B | ID of Third COS Cluster 103K |
| ⋮ |  |  |
| ID of COS Cluster 103G | ID of Second COS Cluster 103B |  |

CONTAINER ORCHESTRATION SYSTEM (COS) SERVICES DISCOVERY ACROSS MULTIPLE COS CLUSTERS BASED ON COS CLUSTER DOMAIN NAME SYSTEM

TECHNICAL FIELD

One or more implementations relate to the field of cloud orchestration systems; and more specifically, to the discovery of COS services across multiple COS clusters based on COS cluster DNS.

BACKGROUND ART

"Cloud" services provide shared resources, software, and information to computers and other electronic devices upon request. In cloud computing environments, software can be accessible over the internet rather than installed locally on in-house computer systems. Cloud services typically involve over-the-internet provision of dynamically scalable and often virtualized resources. Technological details can be abstracted from the users, who no longer have need for expertise in, or control over, the technology infrastructure "in the cloud" that supports them.

The term "micro-services architecture" refers to an architecture in which each of the micro-services does just one thing efficiently and interacts with others of the micro-services as needed. This contrasts with monolithic architectures in which complex software is run on a single, powerful server. Each of the micro-services may use a different type of hardware and/or software to respectively perform a specialized type of processing different from the types of processing performed by the other micro-services. Moreover, the micro-services architecture allows an application to be decomposed into different ones of these smaller micro-services, improving modularity and making the program code easier to understand, design and test. For example, individual micro-services may be modified (e.g., upgraded, swapped out) without affecting the operation of other micro-services used by the application.

A container-orchestration system (COS) automates deployment, scaling and management of containerized applications (also referred to as containerized software and containerized apps); in other words, it provides a platform for automating deployment, scaling, and operations of application containers across clusters of hosts. For example, Kubernetes is a COS that works with a range of container tools, including Docker. Another example of a COS is Docker Swarm. A container is a self-contained execution environment, such as a Linux execution environment; in other words, a container is a standard unit of software that packages up code and all its dependencies, so the application runs quickly and reliably from one computing environment to another. A container image is used to create one or more containers at runtime. A container image is a lightweight, standalone, executable package of software that includes everything needed to run an application: code, runtime, system tools, system libraries and settings (e.g., a Docker container image becomes a Docker container when it is run on Docker Engine; another container engine is Rkt).

With regard to hardware, a COS may include: 1) nodes (also referred to herein as COS nodes), where a node is a representation of a single machine in a COS cluster, where that single machine can be a physical machine in a datacenter or virtual machine hosted on a cloud provider: 2) clusters (also referred to herein as COS clusters), where a cluster represents a more powerful machine resulting from pooling the resources (CPUs and RAM) of the nodes within the cluster; and 3) persistent volumes (a persistent volume is a file system that can be mounted to the cluster, without being associated with any particular node; while traditional local storage associated to each node is treated as a temporary cache to hold programs and data).

With regard to software, a COS may include: 1) containers (also referred to as COS containers, Docker containers, etc.); 2) pods (also referred to herein as "replicas," COS pods," or "kpods" in a Kubernetes implementation), where a pod is the unit of replication and wraps one or more containers that will share the same resources and local network; 3) deployments, where a deployment manages a pod, including declaring the number of replicas of the pod and monitoring the pods; and 4) ingress, where an ingress refers to a communication channel between a service running in a pod and the outside world, and is typically either an ingress controller, a load balancer, Kube-proxy (a combination of a network proxy and a load balancer). In addition, a COS has support for an abstraction (e.g., a Kubernetes Service) that defines a logical set of pods and a policy by which to access them (sometimes called a COS service), as well as an API (e.g., Kubernetes Endpoints API) so that the service provided by one of such abstraction can call the service provided by another such abstraction.

In operation, a COS cluster of nodes is formed and a set of one or more persistent volumes is attached to that cluster; and a COS deployment is launched onto the cluster, which deployment causes the spinning up of the declared number of COS pods (where spinning up a COS pod includes executing the containerized application(s) specified in the container image(s) identified for that COS pod) and monitors them.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 1A is a block diagram illustrating a container orchestration system for enabling discovery of COS services across multiple COS clusters based on COS cluster DNS, according to some example implementations.

FIG. 1C illustrates a block diagram of exemplary COS cluster peers that can be accessible to the DNS replicator, according to some implementations.

DETAILED DESCRIPTION

Figure 1B:
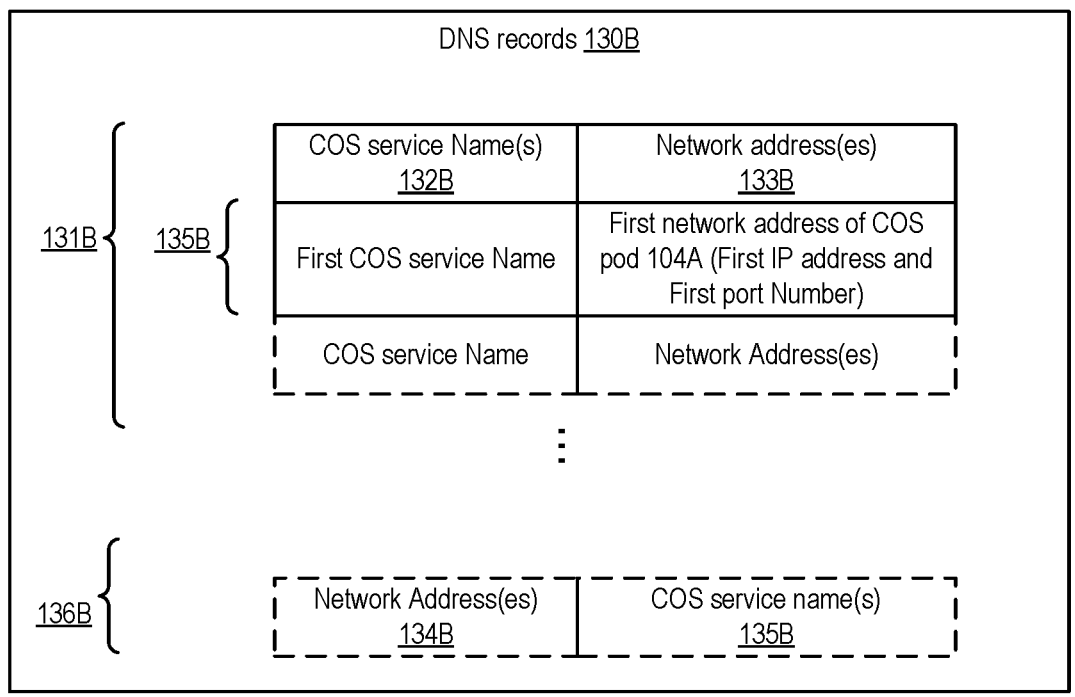
FIG. 1B illustrates a block diagram of exemplary DNS records in a COS cluster DNS server, according to some implementations.

The following description describes a method and system for enabling discovery of COS services across multiple COS clusters based on COS cluster DNS.

Exemplary System

FIG. 1A is a block diagram illustrating a system for enabling discovery of COS services across multiple COS clusters based on COS cluster DNS, according to some example implementations. FIG. 1A illustrates a Container Orchestration System (COS) 102 (e.g., Kubernetes, Docker Swarm) that includes multiple independent COS clusters 103A-K and a DNS replicator 150.

Overview

A COS pod is a basic building block in a COS cluster. A COS pod is a resource that can be created and destroyed on demand. Because a COS pod can be moved or rescheduled to another node of the COS cluster, any internal network address (e.g., Internet Protocol (IP) address) that this pod is assigned can change over time. If another application were to connect to this COS pod, the connection would not work on a next re-deployment as the IP address of the COS pod will change.

A COS service (e.g., a Kubernetes Service) is an abstraction supported by a COS that is used to expose an application running on a set of COS pods as a network service. The COS service defines a logical set of one or more pods and a policy by which to access them. A COS service provides network connectivity to COS pods that work uniformly across COS clusters. Service discovery is the process of figuring out how to connect to a COS service. A COS endpoint is automatically created in a COS cluster when a COS service is created for a set of COS pods deployed in the COS cluster. The COS endpoint is an abstract construct that is associated with a COS service and includes a network address of a COS pod that is part of the COS service. The COS pod is automatically created for a COS pod of a COS service, when the COS pod is deployed in the COS cluster.

The COS 102 enables COS services discovery across the multiple COS clusters 103A-K based on replication of DNS records in local COS cluster DNS servers. A COS cluster can be referred to as a server COS cluster or a client COS cluster. A server COS cluster provides one or more services to other COS clusters in the COS 102. For example, the COS Cluster may include a backend service that runs on a COS pod of the COS cluster and needs to be accessible to front end applications running on other COS clusters. In the examples discussed herein the first COS cluster 103A is a server COS cluster. COS cluster 103A needs to make the first COS service 105A available/discoverable to/by other COS clusters in the COS 102. A client COS cluster is a COS cluster that needs to communicate with one or more other COS clusters in the COS 102 to access services implemented on these COS clusters. For example, the second COS cluster 103B needs to communicate with COS cluster 103A to access the first COS service 105A. In some implementations, a COS cluster may act as a server COS cluster and a client COS cluster. In other implementations, a COS cluster may act as either one of a server or a client COS cluster.

In one implementation, when a first COS service 105A is created in a first COS cluster 103A, the first COS service 105A and one or more first COS endpoints, e.g., first COS endpoint 114A, are received. The first COS service defines a set of one or more COS pods in the first COS cluster, and the first COS endpoint includes a network address of the COS pod 104A. In response to the receipt of the first COS service 105A and the first COS endpoints 114A, a request to create, in a second COS cluster, a second COS service and one or more second COS endpoints is transmitted. The second COS service and the second COS endpoints correspond to the first COS service 105A and the one or more first COS endpoints 114A. The creation of the second COS service and the second COS endpoints causes insertion of one or more first DNS records in a first DNS server (COS Cluster DNS server 120B) that is local to the second COS cluster 103B. The first DNS records are inserted to enable one or more COS pods of the second COS cluster to communicate with the set of one or more COS pods of the first COS cluster through a network. Thus, the COS pods instantiated at the COS cluster 103B are able to discover the services of the COS cluster 103A based on DNS request resolution in the local DNS server of the COS cluster 103B.

In some implementations that use the COS 102, an update to the first COS service in the COS cluster 103A causes an automatic update of the first DNS records in the first DNS server 120B consequently resulting in the first COS service being discoverable and available to the applications running on the second COS cluster 103B. In some implementations, the deletion of the first COS service in the first COS cluster 103A causes an automatic deletion of the first DNS records in the first DNS server 120B resulting in the first COS service no longer being reachable or available for the COS pods of the second COS cluster 103B.

The above implementations are advantageous as compared to some conventional systems. For example, a first conventional system uses COS cluster DNS servers to enable COS service discovery within a COS cluster. A COS cluster DNS server provides DNS name resolution for discovering COS services within the cluster. However, the COS cluster DNS server does not enable DNS name resolution across COS clusters. The COS cluster DNS server does not have knowledge of DNS records of other COS clusters. Other conventional systems use public DNS services for enabling service discovery across COS clusters. These systems use a service (e.g., ExternalDNS for Kubernetes) that 1) retrieves a list of resources (Services, Ingresses, etc.) from the COS controller, 2) determines a list of DNS records based on the list of resources, and 3) configures a central DNS service (e.g., AWS Route 53 or Google Cloud DNS) with the DNS records. Once the DNS records are added to the central DNS service, they are resolvable by all COS clusters. However, these systems have several deficiencies and drawbacks. For example, as the number of COS clusters increases, the rate calls to the central DNS service to update the DNS records associated with these COS clusters increases dramatically. This increase triggers the central DNS service to throttle the received calls for DNS records update. To deal with the throttling, DNS record updates need to be submitted in batches and at a slower rate. The throttling causes a delay in the update of DNS records of COS pods of a COS cluster and prevents these COS pods from being discoverable and therefore from being available for several minutes. Further, when a COS pod is updated, its associated DNS record changes in the COS cluster (e.g., the updated COS pod gets a new IP address during the update process). Further, an update process typically updates a small set of COS pods at a time causing the delay in updating the DNS records for these pods to accumulate resulting in a delay of hundreds of minutes when hundreds or thousands of COS pods are involved potentially causing several hours of delay in critical updates. In addition, multiple COS clusters update the central DNS service. It becomes challenging to define which COS cluster is allowed to update a set of DNS records and which one is not. In central DNS services the access control is typically enforced by restricting access to DNS zones and is particularly hard to define for reverse DNS zones as those zones need to be definable for subnets that are fine grained. Instead of addressing this problem, network administrators end up allowing all COS clusters to update the shared DNS zones. Any one of the COS clusters can delete or modify DNS records of the other COS clusters. Further, even when solutions are implemented for a given central DNS service to solve the throttling and security issues discussed above, another solution needs to be developed when the COS system operate with a different central DNS service, as the solutions to the problem raised above tend to be specific to the central DNS service used.

Thus, the above implementations are advantageous in that they: 1) enable COS service discovery across COS clusters without the need of a central DNS service; 2) enable discovery of COS services by an update of local DNS server(s) of peer COS cluster(s), resulting in a fewer number of requests sent to each one of the peer COS clusters; 3) avoid overload of the peer COS cluster that receives the requests as a fewer number is received by this COS cluster when compared with a central DNS service; 3) avoid the throttling of requests due to the fewer number of requests received at the peer COS cluster.

Further, in some implementations, the first COS service and first COS endpoints are created in a namespace that is shared between multiple COS clusters and the second COS service and second endpoints are also defined in this namespace. This allows for the second COS service and second COS endpoints to not collide with such constructs in other namespaces of the second COS cluster. In some implementations, the names of the first COS service and the second COS service include the name of the COS cluster resulting in unique names for these COS services. In these implementations, the DNS names created for the COS services are derived from the name of the COS cluster and hence there is no danger of overwriting DNS records of other resources stored in the local COS cluster DNS server of the second COS cluster.

The above implementations further enable a seamless access control to the service creation in the second COS cluster as the owner of the second COS cluster can define access control rules as desired using access control constructs provided by the COS system. The owners of the COS clusters can define which COS clusters are allowed to have access to a namespace in the cluster causing the owner to control creation of services within that namespace and consequently the automatic generation of DNS records for that COS service.

Further, the implementations above are independent of the cloud provider platform on which the COS is implemented. The solution for COS services discovery presented herein is portable from one cloud provider platform to another as it relies on COS access control constructs that are independent of the cloud provider platform. Further, the implementations above scale up efficiently, reduce cloud platform costs, and maintain high trust.

Additional Detail

The COS 102 includes the COS clusters 103A-K and a DNS replicator 150. The COS clusters 103A-K and the DNS replicator 150 are operative to communicate through the network 110. A COS cluster includes a COS controller, one or more COS pods, and an optional COS cluster DNS server. For example, COS cluster 103A includes COS controller 126A, first COS pod 104A, COS pods 104N-O, and optional DNS server 120A. COS cluster 103B includes COS controller 126B, COS pod 104D-Q, and DNS server 120B.

A COS controller controls operation of the COS cluster. A COS controller can receive an operation according to configuration information (sometimes referred to as manifests, an "application programming interface (API) object descriptions," or "application configuration information") that describes the desired state of an application in terms of COS constructs. When an application is deployed in a COS cluster, the COS controller starts the containers of the COS pods that implement the application. The COS controller is operative to schedule the containers to run on the COS cluster's nodes (not shown). In some implementations, the nodes communicate with the COS controller using a COS Application Programming Interface (API) (e.g., Kubernetes API), which the COS controller exposes. End users and/or other COS clusters can also use the COS API directly to interact with a COS cluster.

A COS cluster also includes a set of one or more COS pods, e.g., COS pod 104A and optional COS pods 104N-O in COS cluster 103A. In the implementations herein, a COS pod is associated with a COS service and a COS endpoint. A COS service is a COS construct that defines a set of one or more COS pods and policies for these COS pods. For example, the first COS service defines the first COS pod 104A and associated policies. The COS service in a COS cluster has a name (herein referred to as service name) that is unique for that type of resource, i.e., the name of a service is unique across all services defined in a COS cluster. In some implementations, the COS service is defined in the context of a namespace. In these implementations, the name of the COS service is unique across all services defined in a COS cluster for the namespace. In some implementations, the COS service also has an identifier (UID) that is unique across the COS cluster (across different types of resources and constructs defined in the COS cluster). In some implementations, the service name includes the name of the COS cluster. Additionally or alternatively, the namespace in which the COS service is defined includes the name of the cluster. This enables the name of the COS service to be unique across multiple COS clusters.

The first COS pod is associated with the first COS endpoint 114A that includes a network address for the first COS pod. The network address can be an IP address and port number. The first COS endpoint is associated with the COS service that defines the COS pods including the first COS pod. The COS service and the first COS endpoint help provide service discovery for the first COS pod.

A COS cluster DNS server provides a local DNS service to COS pods running in the COS cluster. The COS cluster DNS server provides DNS name resolution within a particular COS cluster to enable COS service discovery within the cluster. For example, COS cluster DNS server 120B provides DNS services to the COS pods 104D-Q in COS cluster 103B. In contrast to conventional COS, the implementations herein enable a COS pod of the COS cluster 103B to resolve DNS requests to internal and external COS pods through the COS cluster DNS server 120B. The COS cluster DNS server 120B is operative to receive a request for a DNS name and return a network address of the network resource associated with the DNS name. In some implementations, the COS cluster DNS server 120B is operative to receive a request for a network address and return a DNS name of the network resource associated with the network address. The COS cluster DNS server 120B includes DNS records 122B. FIG. 1B illustrates a block diagram of exemplary DNS records in a COS cluster DNS server, in accordance with some implementations. The DNS records are used to respond to DNS requests. The DNS records are automatically maintained for the COS cluster. In one implementation, the DNS records include a database 131B containing key-value pairs for lookup. Keys include names of COS services and the values are network addresses (e.g., IP addresses and port numbers) of COS pods on which those services are running. A key may include a unique name of a COS pod in the COS service and maps to a value that includes the IP address of that COS pod. In some implementations, the name of the COS pod includes the name of the service as one component of the name of the COS pod. The DNS records may also include another database 136B containing key-value pairs, where the keys are network addresses (e.g., IP addresses and port numbers) and the values are service names. The database 131B includes the first COS service name that is the name of the first COS service 105A associated with the network address of the COS pod 104A. When a COS service defines more than one COS pod, the network addresses of each one of the COS pods are included in the database 131B for that COS service. The database 131B may also include the names of COS services that are internal to the COS cluster 103B and zero or more additional COS services that are external to the COS cluster 103B. In one implementation, a COS cluster DNS server (e.g., Kube-DNS in Kubernetes) is a COS service that wraps up a COS pod (for example, in Kubernetes, the Kube-DNS service wraps up a COS pod named 'Kube-DNS).

The COS 102 further supports the COS namespace construct. A COS namespace is an abstraction that allows to attach authorization and policy to a subsection of a cluster or to a combination of subsections of multiple clusters. A COS namespace provides a scope for names of resources of a cluster. Names of resources need to be unique within a namespace, but not across namespaces. In some implementations, COS resources (e.g., two COS services) in the same namespace will have the same access control policies. For example, namespaces can be used in environments with many users spread across multiple teams, or projects.

Also, in some implementations, a construct (referred to herein as a service(s) collection) is used to create, organize, and monitor a set of one or more service(s) to be provided. FIG. 1A illustrates the option of having multiple service(s) collection by showing service(s) collection 107A. A service(s) collection is a collection of pods (e.g., kpods), and possibly multiple microservices (e.g., Kubernetes services), that each provide one or more service(s). A service(s) collection is a collection in that it: 1) provides multiple instances of the same service and/or microservice through different COS pods; and/or 2) provides different types of services and/or microservices through different COS pods. For example, implementations may support the release of separate configuration information for each service(s) collection 107A by including a service(s) collection ID assigned to each such service(s) collection 107A. Additionally or alternatively, implementations may support multiple COSs 102 in different data centers in different geographic locations, and each of the COS controllers 126 of these COSs 102 may: 1) track the service(s) collections IDs of the service(s) collection they are hosting; and 2) receive a broadcasting of the configuration information 122 for each update to each of the service(s) collection, and decide whether to act on each respective configuration information based on whether the service(s) collection ID in that respective configuration information is one assigned to one of the collection(s) services being hosted by that COS 102. Additionally or alternatively, different customers (or groups of customers) may be assigned to different (possibly identical) service(s) collections 107A.

In operation, a DNS replicator 150 is operative to enable COS services discovery across multiple COS clusters of the COS 102 based on the update of DNS records in COS cluster DNS servers. In some implementations, the DNS replicator 150 is implemented as a COS service that wraps one or more COS pods in a COS cluster 103C. In other implementations, the DNS replicator 150 can be implemented as an application running on a network device without COS infrastructure. The communication between the DNS replicator 150 and the COS clusters, e.g., COS cluster 103A and COS cluster 103B, can be performed via a resource-based (RESTful) programmatic interface provided via HyperText Transfer Protocol (HTTP). The API supports retrieving, creating, updating, and deleting resources (e.g., COS services, COS endpoints) via the standard HTTP verbs (POST, PUT, PATCH, DELETE, GET). The API also includes additional subresources for many objects (e.g., COS services and COS endpoints, namespaces, etc.) that allow fine grained authorization and access control. It also supports efficient change notifications on resources via a "watch" command and consistent lists to allow caching and synchronization of the state of resources, in particular COS services and COS endpoints.

The DNS replicator 150 monitors one or more COS clusters that include the first COS cluster 103A. In one implementation, the monitoring of the COS clusters, e.g., COS clusters 103A-K, is initiated by transmitting a request to monitor operations of COS services in the COS clusters. In one implementation, the DNS replicator 150 transmits a request to monitor the COS cluster 103A, where the request includes an indication of the type of resource to monitor (e.g., COS service type and COS endpoint type). Optionally the request may include the namespace to which the COS services belong. In other implementations, the request does not include the namespace. In some implementations, the request is a GET request and includes a URL including the type of resource requested and the namespace in which these resources are defined. The request further includes an indication to watch the COS services which causes the COS cluster 103A to return all changes (creates, deletes, and updates) that occur for the type of resource watched. This allows the DNS replicator 150 to watch for changes without missing any updates. If the watch is disconnected, the DNS replicator 150 can restart a new watch from the last returned version of the COS service of the COS service or perform a new request and begin again. In some implementations, the DNS replicator 150 specifies that the resources to be watched are COS services that are associated with an indication that the first COS service is to be monitored. In some implementations, the indication that the COS service is to be monitored can be included in an annotation of the COS service. Thus, the request to monitor the COS services will apply to any new or existing COS services created at the COS cluster 103A associated with this indication. In other implementations, this indication is not transmitted and the DNS replicator 150 monitors and obtains updates from the COS cluster 103A for all COS services created.

When the first COS service 105A and the first COS endpoint 114A are created at the COS cluster 103A, an indication is transmitted from the COS cluster 103A to the DNS replicator 150. The indication indicates that the first COS service and the first COS endpoints are created in the COS cluster 103A. In some implementations, the DNS replicator 150 receives the first COS service 105A and the first COS endpoint 114A as a result of the monitoring (watch) operation. In other implementations, different mechanisms can be used for enabling the COS cluster 103A to transmit creation, updates, or deletion of COS services and endpoints to the DNS replicator 150.

The indication that the first COS service 105A and the first COS endpoint 114A are created are received at the DNS replicator 150. The first COS service defines a set of one or more COS pods in the first COS cluster, e.g., first COS services 105A defines the COS pod 104A. A COS endpoint of the first COS endpoints includes a network address of a COS pod of the set of one or more COS pods. For example, the COS endpoint of the COS pod 104A includes an IP address and a port number of the COS pod 104A.

In some implementations, the DNS replicator 150 determines one or more COS clusters that need to communicate with the first COS cluster through the network. The one or more COS clusters include the second COS cluster 103B. In some implementations, the DNS replicator 150 has access to a set of COS clusters where each one of the COS clusters is associated with one or more peer COS clusters. A COS cluster peer is a COS cluster that needs to communicate with the COS cluster 103A. The COS cluster peer, e.g., COS cluster 103B, acts as a client COS cluster to the COS cluster 103A and is operative to request and access services instantiated on the COS cluster 103A. FIG. 1C illustrates a block diagram of exemplary COS cluster peers that can be accessible to the DNS replicator, in accordance with some implementations. The COS cluster peers set 155 includes COS clusters that act as server COS clusters and their associated COS cluster peers for which they provide one or more COS services. For example, FIG. 1C shows for a COS cluster 103A identified by a unique identifier one or more associated COS cluster peers (ID of second COS cluster 103B and optionally ID of third COS cluster 103K). The data structure (e.g., a table) can be stored as part of the DNS replicator 150. Alternatively, the data structure 155 can be implemented on an external data store (e.g., a database) that is accessible to the DNS replicator 150 through the network. For example, the COS cluster peers set 155 may be implemented externally to the DNS replicator 150, as another service in the COS cluster 103C, on another COS cluster of the COS 102, or another network device in the network 110. A COS cluster may have a single COS cluster peer indicating that a single COS cluster needs to communicate with the COS cluster. For example, COS cluster 103G in the table of FIG. 1C has COS cluster 103B as his peer. In other examples, the COS cluster may have more than one COS cluster peers indicating that more than one COS cluster need to communicate with the COS cluster. For example, COS cluster 103A in the table of FIG. 1C has two COS cluster peers, COS cluster 103B and COS cluster 103K. The identifier of a COS cluster uniquely identifies the COS cluster in the system 102. In some implementations, the COS cluster ID is unique within a given network sub-domain. The network sub-domain has a name that is unique among other such sub-domains inside a higher-level domain. The COS cluster ID can be qualified by the subdomain and domain ID to make it globally unique resulting in DNS keys that are globally unique. In some implementations, the peer relationship between two COS clusters can be defined through a configuration process that includes populating the data structure 155. In some implementations, the configuration can be performed when the COS clusters are deployed.

Referring back to FIG. 1A, upon receipt of the first COS service and the first COS endpoint, the DNS replicator 150 transmits a request to create, in the second COS cluster 103B, a second COS service and a second COS endpoint that correspond to the first COS service and the first COS endpoint. In some implementations, the second COS service and the second COS endpoint are replicas of the first COS service and the first COS endpoint, respectively. The creation of the second COS service and the second COS endpoint causes insertion of one or more first Domain Name System (DNS) records in the COS cluster DNS server 120B of the second COS cluster 103B. The first DNS records are inserted to enable one or more COS pods of the second COS cluster to communicate with the set of one or more COS pods of the first COS cluster through the network 110. For example, the receipt of the request to create the second COS service and the second COS endpoint results in the insertion of the DNS record 135B. The DNS record 135B includes the first COS service name and a first network address of COS pod 104A. When the first COS service includes more than one COS pods, the first COS service name would be associated with additional network addresses of the additional COS pods. The creation of the second COS service 120 does not generate a deployment of COS pods for the second COS service in the COS cluster 103B. Instead, the creation of the second COS service 120 in the COS cluster 103B generates the DNS records for enabling discovery of the first COS service and the COS pods of the first COS service, which are deployed in the first COS cluster 103A.

In some implementations, upon receipt of the request to create the second COS service and the second COS endpoint, the COS cluster 103B determines whether the creation is authorized. In these implementations, the creation of the second COS service and the second COS endpoint is performed when it is determined that the creation is authorized (e.g., that the DNS replicator is authorized to make such a request). If the creation is not authorized, the second COS service and the second COS endpoint are not created, and no DNS records are inserted for the first COS service and pods of the COS service.

In some implementations, the COS cluster 103B may define a set of policies for access and modification of COS resources. The set of policies, e.g., policies 127B, can be used to determine whether the DNS replicator 150 is authorized to create and/or modify the second COS service. In some implementations the policies 127N are associated with a predefined namespace. For example, the request to create the second COS service and second COS endpoint is associated with a first namespace (in which the first COS service and first COS endpoint are defined). Based on this first namespace, the COS cluster 103B determines whether modifications of resources defined in this first namespace are authorized for the DNS replicator 150. Since creation of the set of policies is owned by an admin of the COS cluster 103B, the COS cluster 103B is operative to control who can inject these constructs (e.g., the second COS service and the second COS endpoint) into the COS cluster 103B and also specify which namespace they can do this in. Further, if an error occurs when the set of policies are defined for a given namespace and/or DNS replicator, this error applies only to that namespace and/or COS cluster and does not propagate to other COS clusters and/or namespaces. Since the set of policies are implemented at the COS level, they are independent of the cloud platform on which the COS 102 is implemented and can be used unchanged across cloud platforms of multiple cloud providers.

In some implementations, an administrator of the COS cluster 103B can define a namespace that is common to multiple COS Clusters (which act as COS cluster servers). Each COS service defined by one of these COS clusters includes the name of the COS cluster and is defined in the common namespace. This enables the COS services that are created in the COS cluster 103B in correspondence with COS services deployed on other COS clusters to be defined in this common namespace and not overlap with namespaces of COS services deployed locally on nodes of the COS cluster 103B. Further, in some implementations, the names of the COS services that are replicated from COS cluster 103A to COS cluster 103B may be configured to include a unique identifier of the COS cluster 103A (e.g., a name of the COS cluster 103A). This unique identifier allows the COS cluster 103B to set policies for creating, updating, and deleting COS services at the granularity of the COS cluster. Thus, the set of policies 127B can be defined at the COS cluster granularity or alternatively at a namespace granularity.

Thus, in some implementations, prior to creating the second COS service, the COS cluster 103B determines that the DNS replicator 150 is authorized to create the second COS service and second COS endpoint. If the COS cluster 103B determines that the DNS replicator is not authorized to create the second COS service and the second COS endpoint, the request is not fulfilled.

In some implementations, if the COS cluster 103A has more than one COS cluster peer, the DNS replicator 150 transmits to these other peers the request to create the COS service and COS endpoints. For example, the DNS replicator 150 may transmit to the third COS cluster 103K another request to create a third COS service and a third COS endpoint that correspond to the first COS service 105A and the first COS endpoint 114A. The creation of the third COS service and the third COS endpoint causes insertion of one or more second DNS records in a second DNS server 120K that is local to the third COS cluster 103K. The second DNS records are inserted to enable one or more third COS pods of the third COS cluster 103K to communicate with the COS pod 104A of the first COS cluster 103A through the network 110.

Following the creation of the DNS record 135B, a COS pod of the COS cluster 103, e.g., COS pod 104D, may transmit a DNS request to the COS cluster DNS server 120B. The DNS request may include a name of the first COS service (e.g., domain name). The COS cluster DNS server 120B returns a network address of the COS pod 104A (e.g., IP address and port number). The COS pod 104D receives the network address of the COS pod 104A and is able to communicate with the first COS service 105A and the first COS pod 104A through the network 110. In another example, a DNS request may include a network address, and the COS cluster DNS server 120B may return a name of a COS service.

Update of the COS Service

The solution described herein further enables an automatic update of the DNS records for the first COS service and COS pod 104A. As the first COS service and/or COS pods of the first COS service are updated, the DNS replicator 150 receives the update to the first COS service. In some implementations, the update to the first COS service may be the result of a new COS pod instantiated for the first COS service resulting in the generation of a new COS endpoint for the first service. For example, the failure of a COS Pod on a given node, eviction of a COS pod from a given node, or failure of the node itself forces the COS pod to be removed from that node and moved to another node. This move results in a change of IP address of the COS pod, which results in an update to the COS endpoint associated with the COS pod. The DNS replicator 150 transmits to the second COS cluster 103B, a request to update the second COS endpoint. The update of the second COS service causes an update of the first DNS records in the first COS cluster DNS server 120B of the second COS cluster 103B. Thus, the automatic update of the DNS records for the COS pods of the first COS service in the second COS cluster 103B allows the COS pods of the second COS cluster 103B to reach the COS pods of the first service even when the first COS service is updated. The receipt of the update of the first COS service may result from the DNS replicator 150 continuously monitoring the first COS cluster 103A.

In some implementations, upon receipt of the request to update the second COS service and the second COS endpoint, the COS cluster 103B determines whether the update is authorized. In these implementations, the update of the second COS service and the second COS endpoint is performed when it is determined that this update is authorized (e.g., that the DNS replicator is authorized to make such a request). If the creation is not authorized, the second COS service and the second COS endpoint are not updated and the DNS records for the first COS service and pods of the first COS service are not updated. In some implementations, the COS cluster 103B may perform the determination of whether the update is authorized based on the set of policies 127B for access and modification of COS resources. This determination can be performed based on the namespace in which the second COS service is defined and/or the name of the COS cluster 103A.

Following the update of the DNS records for the second COS service, a COS pod of the COS cluster 103B, e.g., COS pod 104D, may transmit a DNS request to the COS cluster DNS server 120B. The DNS request may include a name of the first COS service (e.g., domain name). The COS cluster DNS server 120B returns an updated network address of the COS pod 104A (e.g., updated IP address and port number). The COS pod 104D receives the updated network address of the COS pod 104A and is able to communicate with the first COS service 105A and the first COS pod 104A through the network 110 based on the updated network address.

Deletion of a COS Service

When the first COS service is deleted, the DNS replicator 150 receives from the first COS cluster 103A an indication that the first COS service is deleted in the first COS cluster 103A. The deletion can be performed by an administrator of the system. The DNS replicator 150 transmits to the second COS cluster 103B a request to delete the second COS service and the second COS endpoint(s). The request to delete the second COS service causes the deletion of the first DNS records in the first COS cluster DNS server 120B of the second COS cluster 103B. Thus, the automatic deletion of the DNS records for the COS pods of the first COS service in the second COS cluster 103B allows the COS pods of the second COS cluster 103B to no longer be able to reach the COS pods of the first service. The receipt of the indication that the first COS service is deleted may result from the DNS replicator 150 continuously monitoring the first COS cluster 103A.

In some implementations, upon receipt of the request to delete the second COS service, the COS cluster 103B determines whether the deletion is authorized. In these implementations, the deletion of the second COS service and the second COS endpoint is performed when it is determined that this deletion is authorized (e.g., that the DNS replicator is authorized to make such a request). If the deletion is not authorized, the second COS service and the second COS endpoint are not deleted and the DNS records for the first COS service and COS pods of the first COS service are not deleted. In some implementations, the COS cluster 103B may perform the determination of whether the deletion is authorized based on the set of policies 127B. The set of policies 127A can be associated with a namespace and/or the name of the COS cluster 103A. The determination of whether the deletion is authorized can be performed based on the namespace in which the second COS service is defined and/or the name of the COS cluster 103A.

Following the update of the DNS records for the second COS service, a COS pod of the COS cluster 103B, e.g., COS pod 104D, may transmit a DNS request to the COS cluster DNS server 120B. The DNS request may include a name of the first COS service (e.g., domain name). The COS cluster DNS server 120B does not return a network address of the COS pod 104A (e.g., updated IP address and port number) as the DNS records for the COS service are deleted. The first COS service is no longer accessible to COS pods of the COS cluster 103B.

Figure 1D:
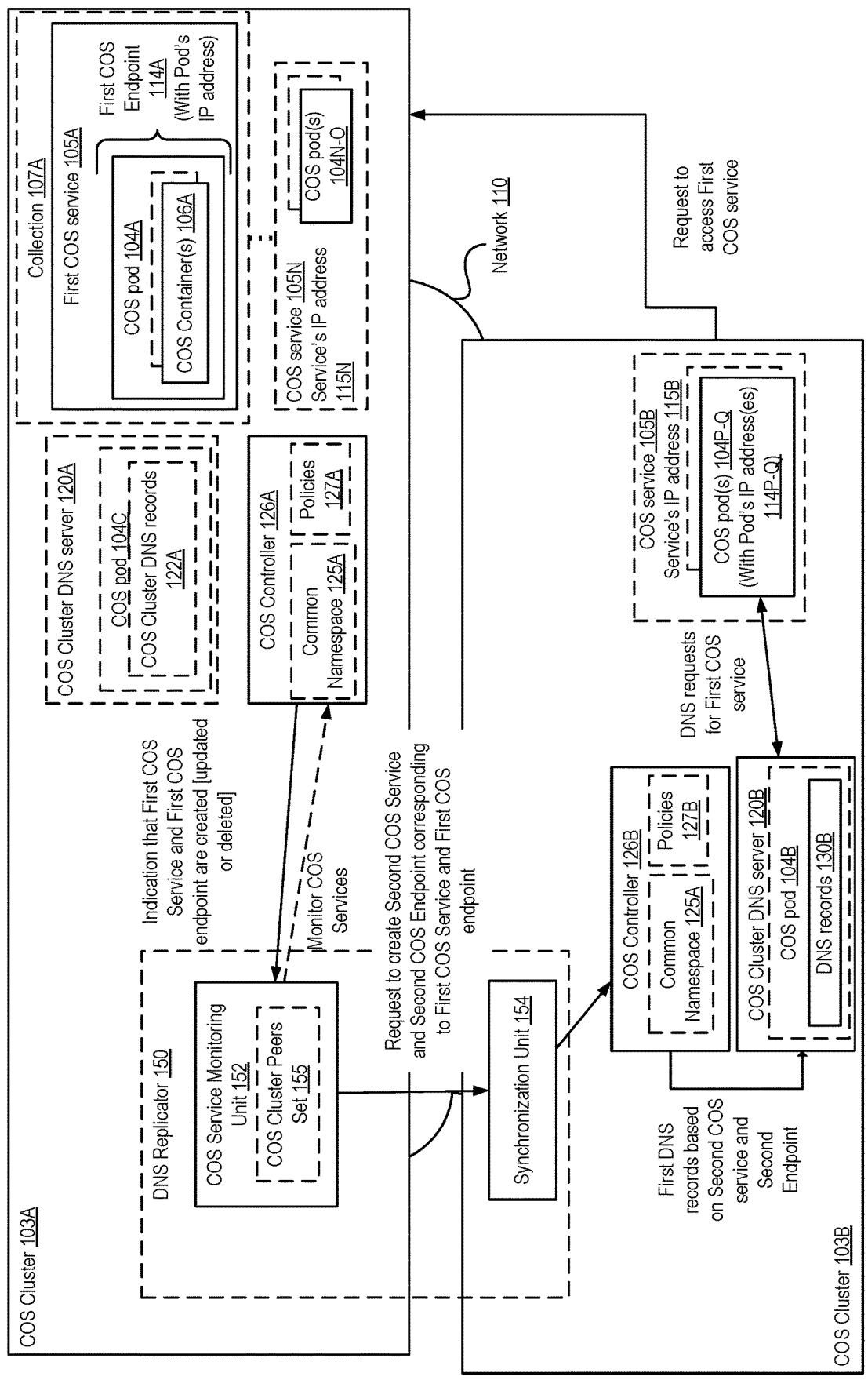
FIG. 1D illustrates a block diagram of an exemplary implementation of a DNS replicator 150.

FIG. 1D illustrates a block diagram of an exemplary implementation of a DNS replicator 150. While in some implementations, e.g., FIG. 1A, the DNS replicator is illustrated as a component that is external to the COS clusters 103A-B, in other implementations, the DNS replicator 150 can be implemented as part of one or more COS clusters. FIG. 1D illustrates an exemplary implementation where the DNS replicator 150 includes multiple logical components, a COS service monitoring unit 152 and a synchronization unit 154, that are distributed across the two COS clusters 103A-B. The COS service monitoring unit 152 is operative to monitor COS services and to receive indications that COS services and COS endpoints are created, updated, and/or deleted. In response to receiving these indications, the COS service monitoring unit 152 transmits a request to create the second COS service and second COS endpoints that correspond to the first COS service and the first COS endpoints. The request is received by the synchronization unit 154 that is operative to cause creation/update/deletion of the second COS service and second COS endpoints in the COS cluster 103B. Further, in this exemplary implementation, the peer COS clusters of a COS cluster may include respective synchronization units that receive requests from the COS service monitoring unit 152 of COS cluster 103A. In some implementations, a COS cluster may include both elements, the COS service monitoring unit 152 and the synchronization unit 154. The monitoring unit 152 is used to monitor COS services that are internal to the COS cluster and the synchronization unit 154 is operative to receive and respond to requests that provide from other COS clusters. Multiple implementations of the DNS replicator 150 can be contemplated without departing from the scope of the implementations described herein.

Exemplary Operation

Figure 2A:
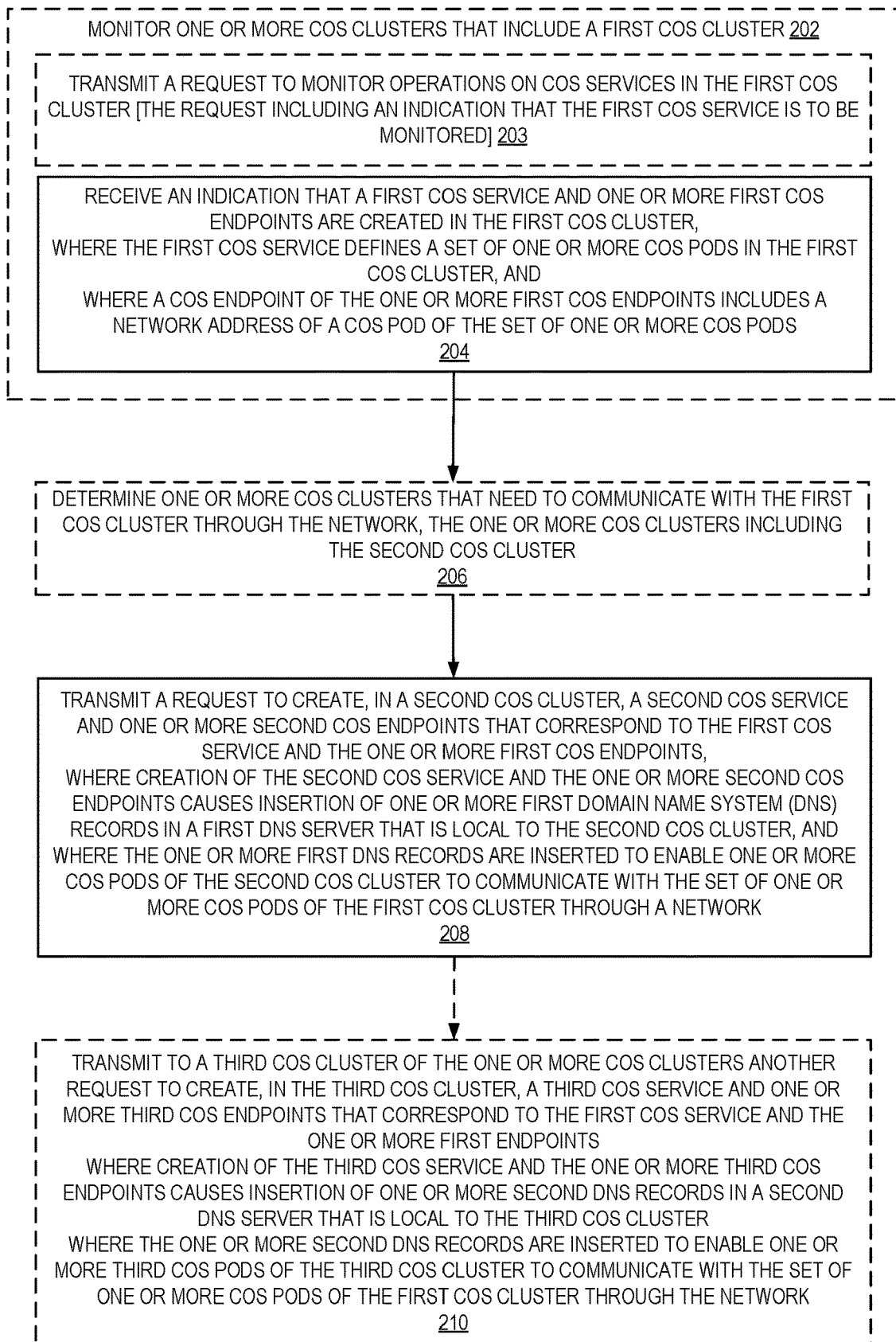
FIG. 2A is a flow diagram illustrating a method in a COS for discovery of COS services across multiple COS clusters, according to some example implementations.

FIG. 2A is a flow diagram illustrating a method for a system of COS services discovery across multiple COS clusters according to some example implementations. The operations of FIG. 2A are performed in DNS replicator 150. Optional bock 202 shows monitoring one or more COS clusters that include a first COS cluster. In one implementation, the monitoring of the COS clusters, e.g., COS clusters 103A-K, is initiated by transmitting a request to monitor operations on micro-services in the COS clusters, block 203.

At block 204, an indication that a first COS service and one or more first COS endpoints are created is received. The indication is received in response to the first COS service and the first COS endpoints being created in the first COS cluster 103A. The indication can be a serialized message describing the type of modification that occurred in the first COS cluster (e.g., creation of the first COS service and the COS endpoints). The first COS service defines a set of one or more COS pods in the first COS cluster, e.g., first COS services 105A defines the COS pod 104A. A COS endpoint of the first COS endpoints includes a network address of a COS pod of the set of one or more COS pods. For example, the COS endpoint of the COS pod 104A includes an IP address and a port number of the COS pod 104A. The receipt of the first COS service and the first COS endpoints is performed in response to the creation of the first COS service and the one or more first COS endpoints in the first COS cluster.

The operations move from block 204 to block 206. Optional block 206, DNS replicator determines one or more COS clusters that need to communicate with the first COS cluster through the network. The one or more COS clusters include the second COS cluster. In some implementations, the DNS replicator has access to a set of COS clusters where each one of the COS clusters is associated with one or more peer COS clusters. A peer COS cluster is a COS cluster that needs to communicate with the COS cluster. The peer COS cluster acts as a client COS cluster to the COS cluster and is operative to request and access services instantiated on the COS cluster. For example, the DNS replicator 150 has access to the data structure in FIG. 1C in which for a COS cluster identified by a unique identifier one or more associated COS cluster peers are identified. The data structure (e.g., a table) can be stored as part of the DNS replicator 150. Alternatively, the data structure can be implemented on an external data store (e.g., a database) that is accessible to the DNS replicator 150 through the network. In one example, COS cluster may have a single COS cluster peer indicating that a single COS cluster needs to communicate with the COS cluster. For example, COS cluster 103G in the table of FIG. 1C has COS cluster 103B as his peer. In other example, the COS cluster may have more than one COS cluster peers indicating that more than one COS clusters need to communicate with the COS cluster. For example, COS cluster 103A in the table of FIG. 1C has two COS cluster peers 103B and 103C. The identifier of a COS cluster uniquely identifies the COS cluster in the system 102.

The operations move from block 206 to block 208. In some implementations, when the operation in block 206 is skipped the flow of operations moves from block 204 to block 208. At block 208, the DNS replicator 150 transmits a request to create, in a second COS cluster, a second COS service and one or more second COS endpoints that correspond to the first COS service and the one or more first COS endpoints. In some implementations, the second COS services and the second COS endpoints are replicas of the first COS service and the first COS endpoints, respectively. The creation of the second COS service and the one or more second COS endpoints causes insertion of one or more first Domain Name System (DNS) records in a first DNS server that is local to the second COS cluster. The one or more first DNS records are inserted to enable one or more COS pods of the second COS cluster to communicate with the set of one or more COS pods of the first COS cluster through a network.

In some implementations, the operations move from block 208 to optional block 210. At block 210, the DNS replicator 150 transmits to a third COS cluster, e.g., COS cluster 103K, of the one or more COS clusters another request to create, in the third COS cluster 103K, a third COS service and one or more third COS endpoints that correspond to the first COS service and the one or more first endpoints. The creation of the third COS service and the one or more third COS endpoints causes insertion of one or more second DNS records in a second DNS server that is local to the third COS cluster. The one or more second DNS records are inserted to enable one or more third COS pods of the third COS cluster 103K to communicate with the set of one or more COS pods of the first COS cluster 103A through the network. The operation of optional block 210 is performed when the first COS cluster is associated with more than one COS cluster peers. In the scenarios where the first COS cluster is associated with a single COS cluster peer, the request to create a COS service that corresponds to the first COS service (and COS endpoints that correspond to the first COS endpoints) is sent only to that COS cluster peer. While the illustrated example of FIG. 1C shows a COS cluster that has two COS cluster peers and a COS cluster that has a single COS cluster peers, other examples are within the scope of the implementations discussed herein where a COS cluster can be associated with any number of COS cluster peers.

Figure 2C:
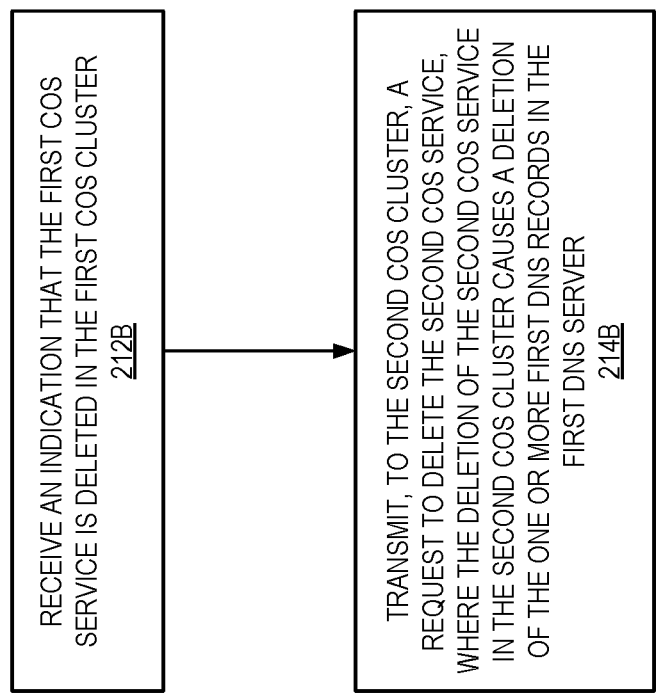
FIG. 2C illustrates a flow diagram of exemplary operations that can be performed for deleting DNS records based on a deletion of the first COS service, according to some implementations.
Figure 2B:
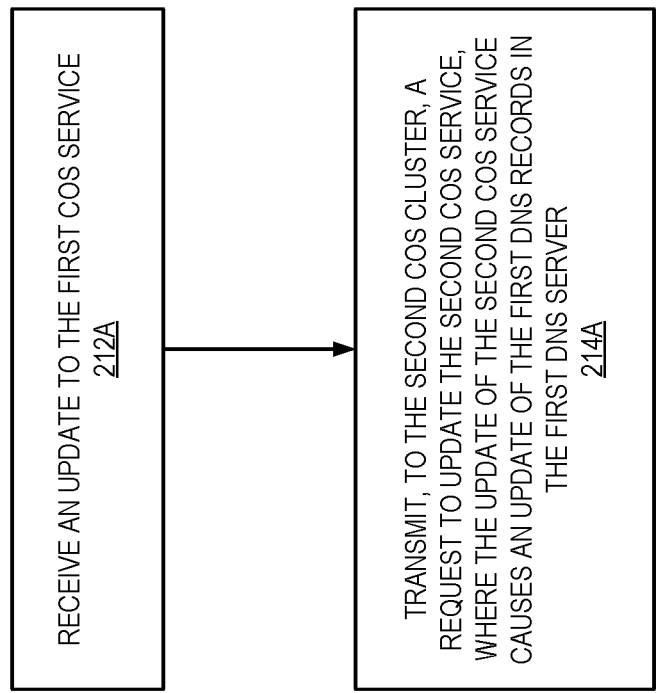
FIG. 2B illustrates a flow diagram of exemplary operations that can be performed for updating DNS records based on an update of the first COS service, according to some implementations.

FIG. 2B illustrates a flow diagram of exemplary operations that can be performed for updating DNS records based on an update of the first COS service, in accordance with some implementations. The operations of FIG. 2B are performed by the DNS replicator 150. At block 212A the DNS replicator 150 receives an update to the first COS service. In some implementations, the update to the first COS service may be the result of a new COS pod instantiated for the first COS service resulting in the automatic generation of a new COS endpoint for the first service. Various types of updates can be contemplated. For example, the number of COS pods backing the COS Service might change causing the IP addresses and the COS pod names to change in the COS endpoint. Further, when a COS pod changes its IP address, the COS endpoint is updated. Another update can be the COS service being renamed causing the previous COS service and the associated COS endpoints to be deleted and new ones created. The update can be received in a serialized message describing what was modified and what the type of modification was (e.g., update). The flow of operations moves from block 212A to block 214A. At block 214A, the DNS replicator 150 transmits to the second COS cluster 103B a request to update the second COS service. The update of the second COS service causes an update of the first DNS records in the first DNS server 120B of the second COS cluster 103B. Thus, the automatic update of the DNS records for the COS pods of the first COS service in the second COS cluster 103B allows the COS pods of the second COS cluster 103B to have the ability to reach the COS pods of the first service upon the update of the first service. The receipt of the update of the first COS service may result from the DNS replicator 150 continuously monitoring the first COS cluster 103A.

FIG. 2C illustrates a flow diagram of exemplary operations that can be performed for deleting DNS records based on a deletion of the first COS service, in accordance with some implementations. The operations of FIG. 2C are performed by the DNS replicator 150. At block 212B, the DNS replicator 150 receives an indication that the first COS service is deleted in the first COS cluster. The indication that the first COS service is deleted is received when the first-COS service is deleted at the first COS cluster 103A. The indication can be a serialized message describing what was modified and what the type of modification was (create, update, delete). The deletion can be performed by an administrator of the system. The flow of operations moves from block 212B to block 214B. At block 214B, the DNS replicator 150 transmits to the second COS cluster 103B a request to delete the second COS service. The request to delete the second COS service causes the deletion of the first DNS records in the first DNS server 120B of the second COS cluster 103B. Thus, the automatic deletion of the DNS records for the COS pods of the first COS service in the second COS cluster 103B allows the COS pods of the second COS cluster 103B to no longer be able to reach the COS pods of the first service. The receipt of the indication that the first COS service is deleted may result from the DNS replicator 150 continuously monitoring the first COS cluster 103A.

Figure 2D:
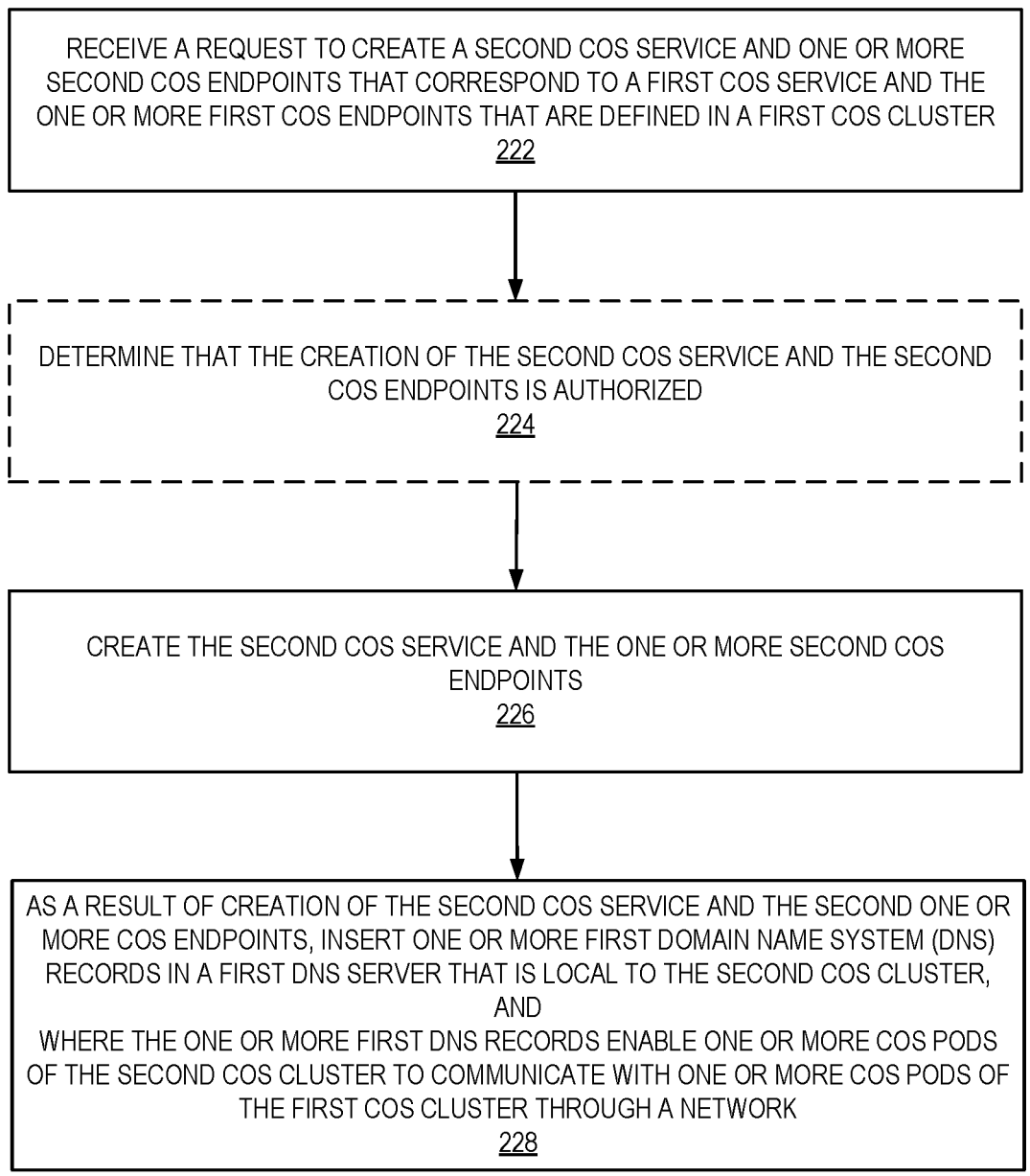
FIG. 2D illustrates a flow diagram of exemplary operations that can be performed upon receipt of a request to create a second COS service and second COS endpoints according to some implementations.

FIG. 2D illustrates a flow diagram of exemplary operations that can be performed upon receipt of a request to create a second COS service and second COS endpoints in accordance with some implementations. The operations of FIG. 2D can be performed by a client COS cluster, e.g., COS cluster 103B or COS cluster 103K, that needs to communicate with COS cluster 103A. In some implementations, some or all of the operations of FIG. 2D can be performed by the COS controller 126B.

At block 222, a request to create a second COS service and one or more second COS endpoints that correspond to the first COS service and the one or more first COS endpoints is received. In some implementations, at block 224 the COS cluster 103B determines that the creation of the second COS service and the second COS endpoints is authorized. In some implementations, the determination that the creation of the second COS services is authorized is performed based on a set of policies defined for the creation of COS services in the COS cluster 103B. In some implementations, the set of policies are associated with predetermined namespace. Different namespaces may be associated with different sets of policies.

Upon determining that the creation of the second COS service and second COS endpoints is authorized, the flow moves to block 226. When it is determined that the creation of the second COS service and second COS endpoints is not authorized, the request is not granted, and the COS service and COS endpoints are not created in the COS cluster 103B. At block 226, the second COS service and the second COS endpoints are created. The second COS service and the second COS endpoints correspond to the first COS service and the first COS endpoints. In some implementations, the second COS service and the second COS endpoints are replicas of the first COS service and the first COS endpoints.

The flow moves to block 228 As a result of creation of the second COS service and the second Cos endpoints, insert one or more first DNS records in a first DNS server that is local to the second COS cluster. The first DNS records enable COS pods of the second COS cluster to communicate with the set of COS pods of the first COS cluster through the network 110. The set of COS pods of the first COS cluster are defined by the first COS service and the first COS endpoints.

Figure 2F:
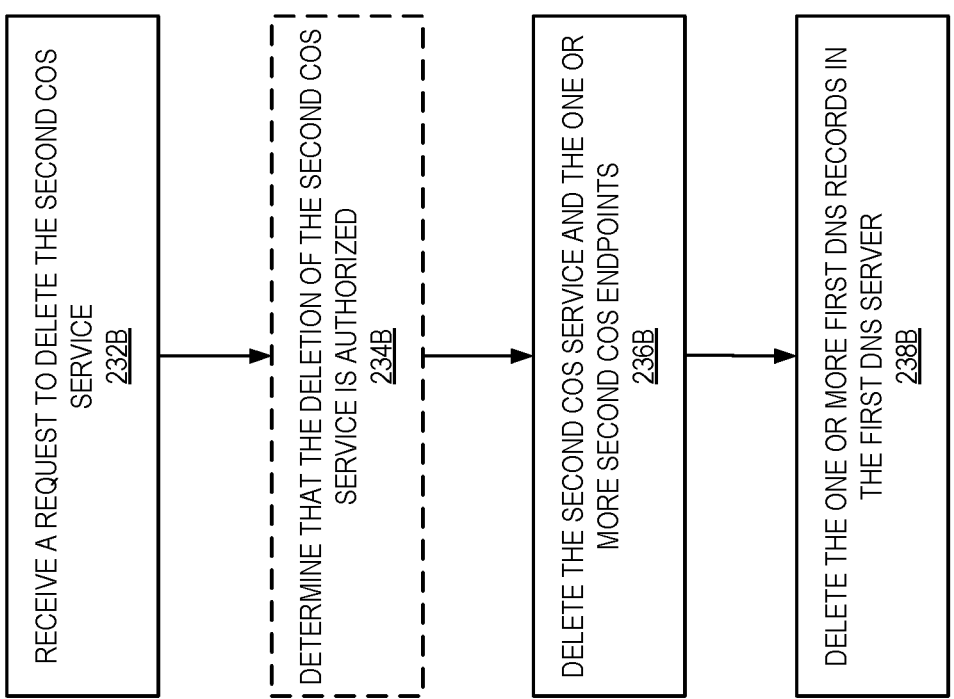
FIG. 2F illustrates a flow diagram of exemplary operations that can be performed when the first COS service is deleted, according to some implementations.
Figure 2E:
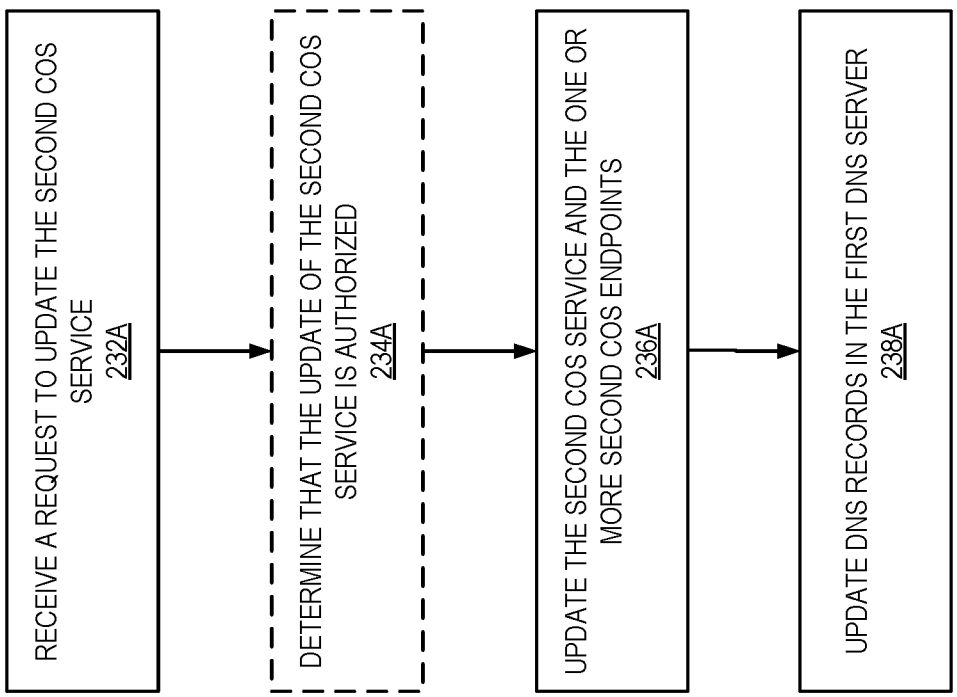
FIG. 2E illustrates a flow diagram of exemplary operations that can be performed when the first COS service is updated, according to some implementations.

FIG. 2E illustrates a flow diagram of exemplary operations that can be performed when the first COS service is updated, in accordance with some implementations. The operations of FIG. 2E can be performed by a client COS cluster, e.g., COS cluster 103B or COS cluster 103K, that needs to communicate with COS cluster 103A. In some implementations, some, or all of the operations of FIG. 2E can be performed by the COS controller 126B.

At block 232A, the COS cluster 103B receives a request to update the second COS service. At block 234A the COS cluster 103B determines that the update of the second COS service is authorized. Upon determining that the update of the second COS service is authorized, the COS cluster 103B updates the second COS service and the one or more second COS endpoints. In some implementations, updating one or more COS endpoints may include deleting a COS endpoint, updating a COS endpoint, and/or adding a COS endpoint for the second COS service. At block 236A, as a result of the update of the second COS service, DNS records associated with the first COS service are updated in the first DNS server 120B of the second COS cluster 103B.

FIG. 2F illustrates a flow diagram of exemplary operations that can be performed when the first COS service is deleted, in accordance with some implementations. The operations of FIG. 2F can be performed by a client COS cluster, e.g., COS cluster 103B or COS cluster 103K, that needs to communicate with COS cluster 103A. In some implementations, some, or all of the operations of FIG. 2F can be performed by the COS controller 126B. At block 232B, the COS cluster 103B receives a request to delete the second COS service. At block 234B the COS cluster 103B determines that the deletion of the second COS service is authorized. Upon determining that the deletion of the second COS service is authorized, the COS cluster 103B deletes the second COS service and the second COS endpoints. Alternatively, if it is determined that the deletion is not authorized, the deletion is not performed, and the request is not granted. At block 236B, as a result of the deletion of the second COS service, DNS records associated with the first COS service are deleted in the first DNS server 120B of the second COS cluster 103B.

Exemplary Implementations

A "reference" refers to a piece of data usable to locate a data structure and may be implemented in a variety of ways (e.g., a pointer, an index, a handle, a key, an identifier, etc.)

Receipt of data by the system may occur differently in different implementations (e.g., it may be pushed to the system (often referred to as a push model), pulled by the system (often referred to as a pull model), etc.)

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third party application developers providing applications/services and another set of tenants may be customers of different ones or all the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 3A:
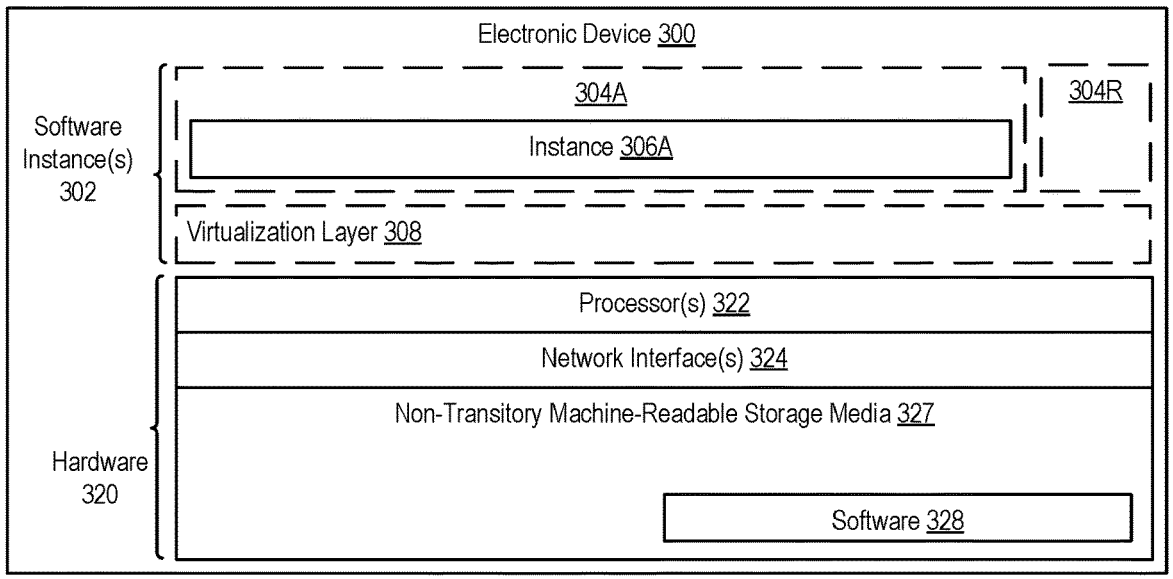
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and non-transitory machine-readable storage media 326 having stored therein software 328 (which includes instructions executable by the set of one or more processor(s) 322). Each of the previously described COS clusters and DNS replicator may be implemented in one or more electronic devices 300. In one implementation: 1) each of the COS clusters is implemented in a separate one of the electronic devices 300 (e.g., in user electronic devices operated by users where the software 328 represents the software to implement COS clusters to interface with the above described DNS replicator (e.g., a web browser, a native client, a portal, a command-line interface, and/or an application program interface (API) based upon protocols such as Simple Object Access Protocol (SOAP), Representational State Transfer (REST), etc.)); 2) the above described DNS replicator is implemented in a separate set of one or more of the electronic devices 300 (e.g., a set of one or more server electronic devices where the software 328 represents the software to implement the above described DNS replicator); and 3) in operation, the electronic devices implementing the COS clusters and the above described DNS replicator would be communicatively coupled (e.g., by a network) and would establish between them (or through one or more other layers) connections for submitting requests to the above described DNS replicator and returning responses to the end COS clusters. Other configurations of electronic devices may be used in other implementations (e.g., an implementation in which the COS clusters and the DNS replicator are implemented on a single electronic device 300).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Exemplary Environment

Figure 3B:
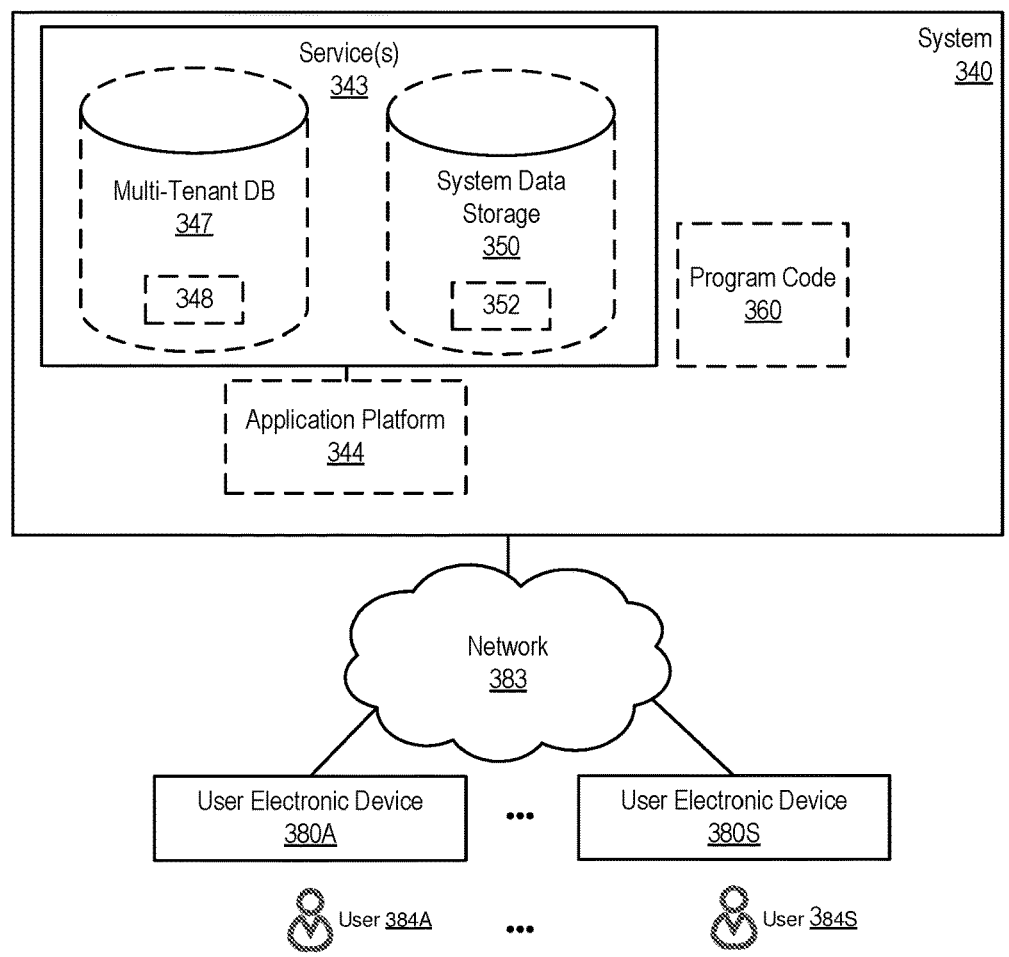
FIG. 3B is a block diagram of an environment where the above discussed COS services discovery technique may be used, according to some implementations.

FIG. 3B is a block diagram of an environment where the above discussed technique of enabling COS services discovery may be used, according to some implementations. A system 340 includes hardware (a set of one or more electronic devices) and software to provide service(s) 342. The system 340 is coupled to user electronic devices 380A-S over a network 382. The service(s) 342 may be on-demand services that are made available to one or more of the users 384A-S working for one or more other organizations (sometimes referred to as outside users) so that those organizations do not need to necessarily be concerned with building and/or maintaining a system, but instead makes use of the service(s) 342 when needed (e.g., on the demand of the users 384A-S). The service(s) 342 may communicate with each other and/or with one or more of the user electronic devices 380A-S via one or more Application Programming Interface(s) (APIs) (e.g., a Representational State Transfer (REST) API). The user electronic devices 380A-S are operated by users 384A-S.

Thus, the system 340 includes at least one instance of the COS 102 of FIG. 1A.

The system 340 may be implemented in a single data center or span multiple data centers. In some implementations, at least one instance of the COS 102 is implemented in each of these one or more data centers.

The service(s) 342, including the one or more services provided by application(s) that are deployed using COS pods using the above discussed release orchestration technique, include a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, the system 340 is a multi-tenant cloud computing architecture and one or more of the service(s) 342 may utilize one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the above-described cloud service, may be coded using Procedural Language/Structured Object Query Language (PUSOQL) that provides a programming language style interface. A detailed description of some PUSOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system 340 and the user electronic devices 380A-S.

Each user electronic device 380A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 380A-S might include an HTTP client, commonly referred to as a "browser," for sending and receiving HTTP messages to and from server(s) of system 340, thus allowing users 384 of the user electronic device 380A-S to access, process and view information, pages, and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other implementations whether or not explicitly described.

For example, the figure(s) illustrating flow diagrams are sometimes described with reference to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, implementations, other than those discussed with reference to the block diagrams, for performing the flow diagrams are within the scope of this description, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method comprising: receiving an indication that a first COS (Cloud Orchestrator System) service and one or more first COS endpoints are created in a first COS cluster, wherein the first COS service defines a set of one or more COS pods in the first COS cluster, and wherein a COS endpoint of the one or more first COS endpoints includes a network address of a COS pod of the set of one or more COS pods; and transmitting a request to create, in a second COS cluster, a second COS service and one or more second COS endpoints that correspond to the first COS service and the one or more first COS endpoints, wherein creation of the second COS service and the one or more second COS endpoints causes insertion of one or more first Domain Name System (DNS) records in a first DNS server that is local to the second COS cluster, and wherein the one or more first DNS records are inserted to enable one or more COS pods of the second COS cluster to communicate with the set of one or more COS pods of the first COS cluster through a network.

2. The method of claim 1 further comprising: determining one or more COS clusters that need to communicate with the first COS cluster through the network, the one or more COS clusters including the second COS cluster.

3. The method of claim 2 further comprising: transmitting to a third COS cluster another request to create, in the third COS cluster, a third COS service and one or more third COS endpoints that correspond to the first COS service and the one or more first COS endpoints, wherein creation of the third COS service and the one or more third COS endpoints causes insertion of one or more second DNS records in a second DNS server that is local to the third COS cluster, and wherein the one or more second DNS records are inserted to enable one or more third COS pods of the third COS cluster to communicate with the set of one or more COS pods of the first COS cluster through the network.

4. The method of claim 1 further comprising: receiving an indication that the first COS service is updated; and transmitting, to the second COS cluster, a request to update the second COS service, wherein the update of the second COS service causes an update of the one or more first DNS records in the first DNS server.

5. The method of claim 1 further comprising: receiving an indication that the first COS service is deleted in the first COS cluster; and transmitting, to the second COS cluster, a request to delete the second COS service, wherein the deletion of the second COS service in the second COS cluster causes a deletion of the one or more first DNS records in the first DNS server.

6. The method of claim 1, wherein the creation of the second COS service and second COS endpoints is performed when the second COS cluster determines that the creation is authorized.

7. The method of claim 1, wherein the first COS service is defined in a namespace that is common to a plurality of COS clusters that provide services to the second COS cluster.

8. The method of claim 1, wherein the receiving the indication that the first COS service and the one or more first COS endpoints are created is performed while monitoring COS clusters that include the first COS cluster.

9. The method of claim 8, wherein the first COS service is associated with an indication that the first COS service is to be monitored.

10. The method of claim 1, wherein the second COS service and the one or more second COS endpoints are replicas of the first COS service and the one or more first COS endpoints.

11. The method of claim 1, wherein the receiving the indication that the first COS service and the one or more first COS endpoints are created and the transmitting the request to create, in the second COS cluster, the second COS service and the one or more second COS endpoints are performed in response to the creation of the first COS service and the one or more first COS endpoints in the first COS cluster.

12. A non-transitory machine-readable storage medium that provides instructions that, if executed by a machine, will cause said machine to perform operations comprising: receiving an indication that a first COS (Cloud Orchestrator System) service and one or more first COS endpoints are created in a first COS cluster, wherein the first COS service defines a set of one or more COS pods in the first COS cluster, and wherein a COS endpoint of the one or more first COS endpoints includes a network address of a COS pod of the set of one or more COS pods; and transmitting a request to create, in a second COS cluster, a second COS service and one or more second COS endpoints that correspond to the first COS service and the one or more first COS endpoints, wherein creation of the second COS service and the one or more second COS endpoints causes insertion of one or more first Domain Name System (DNS) records in a first DNS server that is local to the second COS cluster, and wherein the one or more first DNS records are inserted to enable one or more COS pods of the second COS cluster to communicate with the set of one or more COS pods of the first COS cluster through a network.

13. The non-transitory machine-readable storage medium of claim 12, wherein the operations further comprise: determining one or more COS clusters that need to communicate with the first COS cluster through the network, the one or more COS clusters including the second COS cluster.

14. The non-transitory machine-readable storage medium of claim 13, wherein the operations further comprise: transmitting to a third COS cluster another request to create, in the third COS cluster, a third COS service and one or more third COS endpoints that correspond to the first COS service and the one or more first COS endpoints, wherein creation of the third COS service and the one or more third COS endpoints causes insertion of one or more second DNS records in a second DNS server that is local to the third COS cluster, and wherein the one or more second DNS records are inserted to enable one or more third COS pods of the third COS cluster to communicate with the set of one or more COS pods of the first COS cluster through the network.

15. The non-transitory machine-readable storage medium of claim 12, wherein the operations further comprise: receiving an indication that the first COS service is updated; and transmitting, to the second COS cluster, a request to update the second COS service, wherein the update of the second COS service causes an update of the one or more first DNS records in the first DNS server.

16. The non-transitory machine-readable storage medium of claim 12, wherein the operations further comprise: receiving an indication that the first COS service is deleted in the first COS cluster; and transmitting, to the second COS cluster, a request to delete the second COS service, wherein the deletion of the second COS service in the second COS cluster causes a deletion of the one or more first DNS records in the first DNS server.

17. The non-transitory machine-readable storage medium of claim 12, wherein the creation of the second COS service and second endpoints is performed when the second COS cluster determines that the creation is authorized.

18. The non-transitory machine-readable storage medium of claim 12, wherein the first COS service is defined in a namespace that is common to a plurality of COS clusters that provide services to the second COS cluster.

19. The non-transitory machine-readable storage medium of claim 12, wherein the receiving the indication that the first COS service and the one or more first COS endpoints are created is performed while monitoring COS clusters that include the first COS cluster.

20. The non-transitory machine-readable storage medium of claim 19, wherein the first COS service is associated with an indication that the first COS service is to be monitored.

21. The non-transitory machine-readable storage medium of claim 12, wherein the second COS service and the one or more second COS endpoints are replicas of the first COS service and the one or more first COS endpoints.

22. The non-transitory machine-readable storage medium of claim 12, wherein the receiving the indication that the first COS service and the one or more first COS endpoints are created and the transmitting the request to create, in the second COS cluster, the second COS service and the one or more second COS endpoints are performed in response to the creation of the first COS service and the one or more first COS endpoints in the first COS cluster.

* * * * *